United States Patent [19]

Catelli

[11] 4,432,276

[45] Feb. 21, 1984

[54] CONTRIVANCE FOR HEATING, PASTEURIZING AND STERILIZING FLUID FOODSTUFFS

[75] Inventor: Camillo Catelli, Parma, Italy

[73] Assignee: Rossi & Catelli S.P.A., Parma, Italy

[21] Appl. No.: 375,972

[22] Filed: May 7, 1982

[30] Foreign Application Priority Data

May 29, 1981 [IT] Italy .............................. 40055 A/81

[51] Int. Cl.$^3$ .............................................. A23C 3/02
[52] U.S. Cl. ...................................... 99/453; 99/483; 99/516; 422/26; 422/307
[58] Field of Search .......................... 99/452, 453–455, 99/467, 470, 471, 473–476, 483, 516, 534; 426/520–522; 422/26, 307; 261/108, 112, 115–118; 159/4 R, 4 A

[56] References Cited

U.S. PATENT DOCUMENTS 3,973,048 8/1976 Sollerud .............................. 426/522
4,375,185 3/1983 Mencacci ........................ 99/516 X Primary Examiner—Timothy F. Simone
Attorney, Agent, or Firm—Darby & Darby

[57] ABSTRACT

The invention relates to apparatus for heating/pasteurizing/sterilizing fluids, which comprises a main chamber (1) in which the substance to be heated is brought into direct contact with heating fluid, and a transit chamber (4) in which the substance circulates prior to entering the main chamber, also a tubular element (7) part-contained within the transit chamber and extending forth from within same in order to combine with the transit chamber exit aperture (6) in creating an annular exit collar (10) through which the substance flows in order to reach the main chamber bottom by running down the tubular element side wall; the tubular element and the transit chamber inner wall creating an annular passage (13) immediately up-flow of said exit aperture whose acess-capacity may be adjusted by axial slide of the tubular element thus affording the means by which to regulate flow through the contrivance.

10 Claims, 1 Drawing Figure

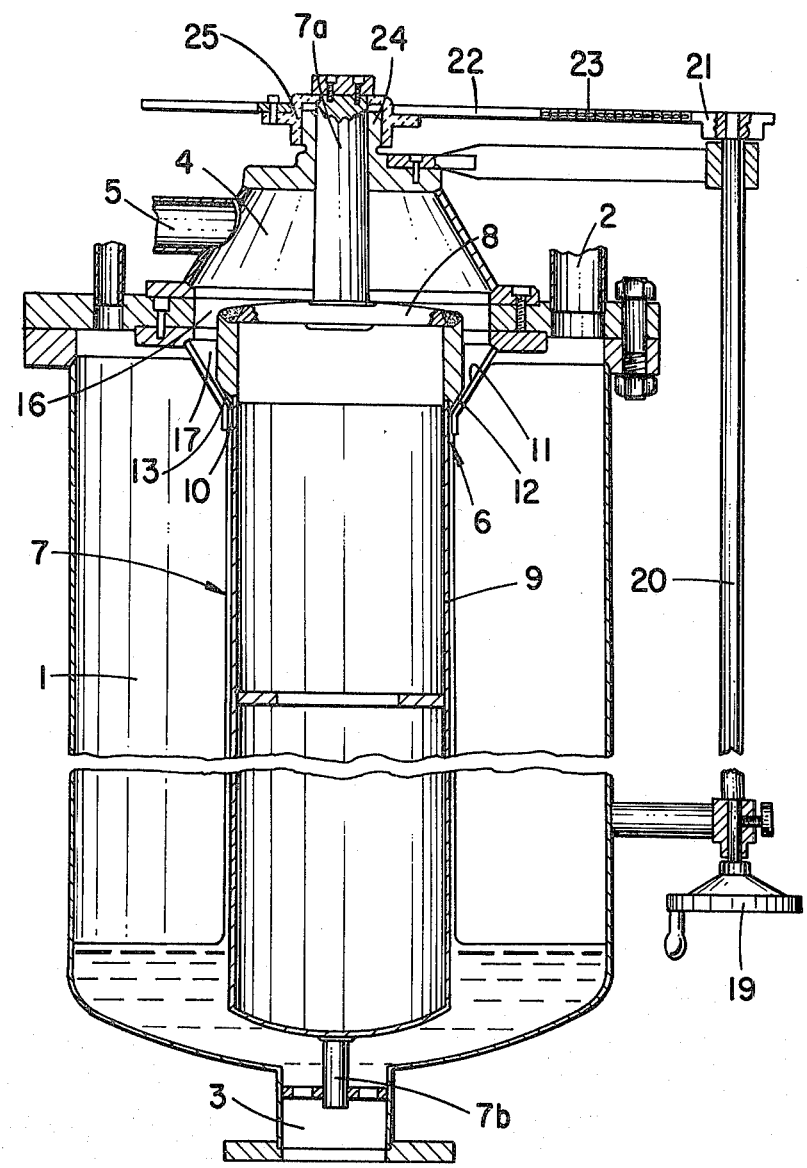

CONTRIVANCE FOR HEATING, PASTEURIZING AND STERILIZING FLUID FOODSTUFFS

BACKGROUND OF THE INVENTION

The invention described herein is a contrivance for heating and/or sterilizing and/or pasteurizing liquids and foodstuffs in fluid state.

The specification is drawn up with those problems in mind relating to the sterilization of milk, though the contrivance is clearly suited to similar treatment of like foodstuffs such as creams, puddings, desserts, processed cheese, preserves, and all kinds of juices and purees extracted from fruit, vegetables, plus wines and grape-juice etc.—viz. heating to the point of pasteurizing or full sterilization.

Modern methods of sterilization provide for the milk being raised to a high temperature (Ca 140° C.) for a duration of some few seconds (between 3 and 8s); it is now known that by imparting such heat to the milk for a short duration, chemical and physical changes brought about therein are reduced with respect to those induced by longer duration at a lower temperature. When sterilizing milk at high temperature, best results are obtained by introduction of the milk direct into an enclosure, followed by injection of high-temperature steam in such a way that the milk is brought into direct contact with the heat-inducing vapor.

Known devices and contrivances for carrying out processes such as this provide, for instance, for the milk's being allowed to fall freely through a series of slots into a chamber whereinto vapor is duly introduced, the milk then accumulating at the chamber bottom and being subsequently drawn off.

This type of device shows up certain drawbacks however: first and foremost, the milk splashes up in falling to the chamber floor, with the result that the chamber wall/s can become splattered with droplets such as to form encrustations thereon—this bringing the additional minus-factor of imparting an unpleasant burnt taste to the milk; secondly, the milk becomes markedly turbulent within the chamber, thus foaming and producing the same defects as aforementioned. Flow-regulation in a system of this kind presents problems, as this is brought about by closing one or more of the slots—the consequence being that milk will burn each time slots thus closed off are re-opened by coming into contact with the edges of the slots themselves, giving rise to the burnt taste as described.

Furthermore, the device thus described is a complex embodiment constructively speaking, and requires frequent attention in terms of maintenance, as the slot-insides must be cleaned off regularly.

One of the objects of the invention described herein is that of eliminating drawbacks such as those outlined, providing a contrivance in which the substance being processed will never come into accidental contact with the hot inner surfaces of the contrivance proper, and in which the substance itself may be heated, pasteurized or fully sterilized without becoming subject to unwarranted turbulence.

A further object of the invention is that of embodying a constructively simple contrivance which does not necessitate frequent maintenance.

Another object of the invention is that of providing a contrivance capable of delivering a fully-sterilized and pleasant-tasting product.

SUMMARY OF THE INVENTION

Objects thus defined, and others, are arrived at by the heating/pasteurizing/sterilizing contrivance described herein, being of the type comprising a main chamber furnished with a hole for entry of a heating fluid and a hole for exit of the end-product, wherein the substance to be heated comes into direct contact with said heating fluid, and characterized by the fact that it comprises:—a transit chamber having an entry aperture through which the substance is admitted and an exit aperture disposed with axis vertical and giving out into said main chamber through which the substance passes from within the transit chamber, said transit chamber located uppermost of said main chamber; a tubular element disposed coaxially with said exit aperture and part-contained by said transit chamber whilst issuing therefrom by way of some exit aperture in such a way as to create an annular exit collar therewith of predetermined and uniform perimeter width; the inner wall of said transit chamber and the outer wall of said tubular element being of shape such as to establish an annular passage lying immediately up-flow of said exit collar and determining flow rate therethrough.

BRIEF DESCRIPTION OF THE DRAWING

Further features and advantages of the invention will emerge more clearly from the detailed description of a preferred form of embodiment which follows, this illustrated as a strictly unlimitative example with the aid of one accompanying drawing in which the contrivance is represented schematically and in vertical section-through.

DESCRIPTION OF THE PREFERRED EMBODIMENT

The contrivance to which the invention relates comprises a main chamber 1 of basically cylindrical shape having an inlet hole 2 for entry of a heating fluid (vapor in this instance) and an outlet hole 3 through which the end product—milk in this case—discharges after having undergone pasteurization, sterilization, or simply being heated.

The contrivance further comprises a transit chamber 4 located at the upper region of main chamber 1 and provided with an entry aperture 5 through which to introduce the substance for processing, and an exit aperture 6 disposed with axis vertical and giving out into main chamber 1 thus affording an outlet for said substance. The transit chamber 4 is made fast to the main chamber upper region 1 and exhibits a first cylindrical section 16 whose diameter is greater than that of a second cylindrical section which serves to define said exit aperture 6, the two cylindrical sections joined by a further, truncated-conical section 17.

Both first and second cylindrical sections, as well as the truncated cone, are disposed coaxially; thus all three have a common vertical axis.

The contrivance further comprises a tubular element 7 disposed coaxially with said exit aperture 6 hence with transit chamber 4, a part thereof 8 being accommodated within the latter 4; the part 9 issuing from transit chamber 4 passing through exit aperture 6.

That part 9 of the tubular element 7 which issues forth from the exit aperture 6 of said transit chamber creates an annular exit collar 10 of predetermined width which establishes the passage affording maximum flow rate through said contrivance; the interspace at exit collar 10 being of uniform perimeter width.

An annular passage 13 lying immediately up-flow of exit roller 10 determines actual flow rate through the contrivance by dint of the access it affords; said annular passage being created by the inner wall 11 of the transit chamber truncated-cone section and the outer wall 12 of tubular element 7, the latter likewise being invested with truncated-conical shape; thus, the annular passage 13 lying therebetween describes a truncated cone.

Provision is made for means of imparting motion to tubular element 7 causing it to slide axially with respect to transit chamber 4. In the embodiment pictured, said means comprise a flywheel 25 attached to the uppermost extremity 7a of tubular element 7 which when screwed or unscrewed with respect to a threaded shank 24 located uppermost of the contrivance produces upward and downward slide of the tubular element 7. Drive imparted to the flywheel 25 derives from a handwheel 19 which when turned causes a rod 20 to rotate; a sprocket 21 affixed coaxially to rod 20 transmits movement by way of chain 23 to a gear 22 affixed coaxially to flywheel 25 and turning as one therewith.

It will be clear that such drive means can be of any conventional type.

The contrivance also comprises guide means such as will maintain the coaxial relationship between exit aperture 6 and tubular element 7 during actual slide of the latter. In the embodiment illustrated, means to this end are afforded by upper and lower extremities 7a and 7b of the tubular element itself 7 which form sliding pairs by inserting into a seating located in the upper part of the transit chamber, and into the main chamber outlet 3, respectively; the said seating located uppermost of transit chamber 4 and the main chamber outlet 3 being disposed coaxially both with the transit chamber itself and with the tubular element.

Provision would be made at the tubular element lower extremity 7b for the necessary apertures through which to draw off the end product from main chamber 1 via outlet 3.

For reasons which will become apparent as the description unfolds, tubular element 7 can either be closed off at both ends so as to create a complete enclosure, or remain open at the upper extremity such that the void within communicates with the outer environment; furthermore, the cylindrical section 9 of tubular element 7 is of length such that the lower extremity thereof reaches to within close proximity of the main chamber bottom, thus remaining constantly immersed in the end product lying at the chamber bottom and maintained at a predetermined level.

Function is as follows: →

The contrivance described herein is intended for utilization in continuous-cycle sterilization plant. With this in mind, the running stage only of the contrivance proper as illustrated in the drawing is described here—start-up and shut-down being purely incidental, presenting no particular difficulty, and having no real bearing on the central theme supported by claims.

A given level of the processed product is maintained at the bottom of chamber 1 by means of suitable conventional regulating components. Vapor is introduced into the main chamber 1 by way of inlet 2, the actual temperature of which dependent upon the type of process and the nature of the substance subjected thereto; the substance entering transit chamber 4 by way of entry aperture 5, and the treated end product being drawn off continuously from the bottom of main chamber 1 via outlet 3.

The substance fed into the transit chamber falls to the bottom of some passing thence through annular passage 13 whose accessible section may be adjusted by working handwheel 19 in such a way as to produce a constantly regulated flow of said substance through annular passage 13 whilst ensuring the latter remains fully and constantly primed with the descending substance,—this in order to prevent vapor from reaching the transit chamber interior.

In this way, the annular passage 13 causes even distribution of the substance onto and about tubular element 7, the substance then issuing from exit collar 10 and slithering down the cylindrical wall 9 of tubular element 7 thereby gaining the bottom of the chamber 1. The film thus formed which slides the length of the tubular element comes into contact with vapor present in the main chamber 1, with the result that it undergoes a rapid heating such as to produce pasteurization and/or sterilization.

In the event of that plant-stage downflow of the contrivance requiring increased or diminished receipt of the end product, the corresponding increase or decrease in access through annular passage 13 will be obtained by working handwheel 19; the greater or lesser quantity of the substance induced thus to pass through annular passage 13 will remain evenly distributed when emerging from the exit collar onto the tubular element wall, and will run down over the tubiform in identical fashion, the only difference being in the greater or lesser corresponding thickness of the film thus formed.

Likewise, the quantity of the substance brought in through entry aperture 5 would be regulated by means of suitable cocks, valves etc. according to flow requirement in the plant downstream of the sterilizing contrivance itself.

The dimensions of the tubular element 7—in particular those of section 9—will be assessed according both to maximum flow required from the contrivance and to the length of time envisaged for passage of the product through the main chamber 1,—viz. by augmenting the diameter of tubular element 7 an increase in maximum flow capacity will be achieved, whilst by lengthening tubiform 9 one is able to extend the time-lapse determining a product's stay within main chamber 1.

A substance processed by the contrivance described herein makes continual contact only with those walls subject to incessant bathing by that same substance, with the result that such walls are never in danger of reaching temperatures likely to burn the end product.

Normally speaking, tubular element 7 would be a complete enclosure in that temperatures reached by the wall thereof do not present a problem; if it were thought desirable to cool the wall however, or to impose an exact temperature setting, then by opening the tube at upper extremity 7a the internal void will be caused to communicate with the outside; alternatively, fluid may be introduced at a predetermined temperature to the tube interior.

The constant immersion of section 9 of the tubular element within such fluid as lies at the chamber bottom 1 prevents the product both from splashing and from becoming turbulent; this same state could clearly be maintained with the tubular element raised marginally above the fluid level at the chamber bottom, though less effectively so.

Numerous modifications of a practical nature may be applied to the contructive details of the invention thus described without by any means straying from within bounds of protection afforded to the basic concept as expounded in the supporting claims.

What is claimed:

1. Apparatus for heating and/or pasteurizing and/or sterilizing fluid foodstuffs of the type comprising a main chamber furnished with an inlet through which to admit heating fluid and with an outlet through which to draw off the end product, wherein the substance to be heated comes into direct contact with the heating fluid, characterized by the fact that it comprises: a transit chamber having an entry aperture through which to admit the substance and an exit aperture disposed with a vertical axis and opening into said main chamber through which the substance passes from within said transit chamber, said transit chamber being located uppermost of said main chamber; a tubular element disposed coaxially with said exit aperture and part-contained by said transit chamber whilst issuing therefrom by way of same exit aperture thus creating an annular exit collar therewith of predetermined and uniform perimeter width; the inner wall of said transit chamber and the outer wall of said tubular element being of a shape such as to establish an annular passage lying immediately up-flow of said exit collar and determining flow rate through the apparatus and said fluid foodstuff flowing through said main chamber along said outer wall of said tubular element.

2. Apparatus according to claim 1 characterized by the fact that the said annular passage describes a truncated-conical surface area; provision being made for means of transmission by which to produce axial slide of said tubular element and for guide means by which to maintain coaxial relationship between tubular element and exit aperture during said axial slide.

3. Apparatus according to claim 1 characterized by the fact that that part of the tubular element issuing from the transit chamber as aforesaid is of a length such as to achieve close proximity with the bottom of said main chamber, and in any event such as to remain constantly immersed in fluid lying at the chamber bottom and maintained thus at a predetermined level.

4. Apparatus according to claim 1 characterized by the fact that that part of the tubular element issuing from the transit chamber as aforesaid is cylindrical.

5. Apparatus according to claim 1 characterized by the fact that the said tubular element is enclosed at both extremities.

6. Apparatus according to claim 1 characterized by the fact that the uppermost extremity of said tubular element extends outward from said transit chamber and said main chamber, and is open.

7. Apparatus according to claim 1 characterized by the fact that: the said transit chamber exhibits a first cylindrical section whose diameter exceeds that of a second cylindrical section defining exit aperture aforesaid; said first and second cylindrical sections joined by and coaxial with a further truncated conical section.

8. Apparatus according to claim 1 characterized by the fact that the uppermost extremity of said tubular element inserts exactly into and forms a sliding pair with a seating located in the upper region of said transit chamber and disposed coaxially thereto.

9. Apparatus according to claim 1 characterized by the fact that the lower extremity of said tubular element inserts exactly into and forms a sliding pair with the main chamber outlet, whilst possessing such apertures as are necessary to discharge of the end product from within the main chamber.

10. Apparatus according to claim 2 characterized by the fact that said transmission means comprise a flywheel made fast to the uppermost extremity of said tubular element and screwing or unscrewing about a threaded shank located uppermost of the apparatus; further comprising a handwheel serving to impart rotation to said flywheel by way of a chain loop driven by a sprocket—made fast to and turning as one with said handwheel—and wrapped about a gear affixed to said flywheel and disposed coaxially thereto.

* * * * *